(12) United States Patent
Yoshidome et al.

(10) Patent No.: US 9,863,301 B2
(45) Date of Patent: Jan. 9, 2018

(54) FILTER FAULT DETECTION APPARATUS

(71) Applicant: DENSO CORPORATION, Kariya, Aichi-pref. (JP)

(72) Inventors: Manabu Yoshidome, Kariya (JP); Masato Katsuno, Anjo (JP)

(73) Assignee: DENSO CORPORATION, Kariya (JP)

(*) Notice: Subject to any disclaimer, the term of this patent is extended or adjusted under 35 U.S.C. 154(b) by 269 days.

(21) Appl. No.: 14/607,666

(22) Filed: Jan. 28, 2015

(65) Prior Publication Data
US 2015/0211405 A1 Jul. 30, 2015

(30) Foreign Application Priority Data

Jan. 29, 2014 (JP) .................................. 2014-014356

(51) Int. Cl.
*F01N 11/00* (2006.01)
(52) U.S. Cl.
CPC .......... *F01N 11/00* (2013.01); *F01N 2550/04* (2013.01); *F01N 2560/05* (2013.01); *F01N 2900/1606* (2013.01); *Y02T 10/47* (2013.01)
(58) Field of Classification Search
CPC .. F01N 2560/05; F01N 11/00; F01N 2550/04; F01N 2900/1606; Y02T 10/47
See application file for complete search history.

(56) References Cited

U.S. PATENT DOCUMENTS

| 4,656,832 | A | 4/1987 | Yukihisa et al. | |
|---|---|---|---|---|
| 8,561,388 | B2* | 10/2013 | Yahata | F01N 11/007 60/274 |
| 8,863,496 | B2* | 10/2014 | Mitani | F01N 3/0275 422/186.03 |
| 9,032,719 | B2* | 5/2015 | Sun, Jr. | F01N 11/00 60/274 |
| 2011/0320171 | A1* | 12/2011 | Okayama | B01D 46/0086 702/183 |
| 2012/0144813 | A1* | 6/2012 | Yahata | F01N 11/007 60/311 |

FOREIGN PATENT DOCUMENTS

| JP | 59-60018 | 4/1984 |
|---|---|---|
| JP | 5115873 | 10/2012 |

* cited by examiner

*Primary Examiner* — Freddie Kirkland, III
(74) *Attorney, Agent, or Firm* — Nixon & Vanderhye PC

(57) ABSTRACT

A filter fault detection apparatus for a filter mounted on an exhaust passage of an internal combustion engine for collecting particulate matter includes a sensor mounted on the exhaust passage downstream of the filter. The sensor includes an insulative sensor element formed with a pair of electrodes on which particulate matter is collected, the sensor generating a sensor output corresponding to an amount of particulate matter collected on the sensor element when the electrodes become electrically conductive therebetween, causing the sensor output to rise. The apparatus further includes an acquiring unit that acquires, as an output variation, a temporal variation of the sensor output after rise of the sensor output, and a fault determination unit that performs a fault detection process for detecting presence of a fault in the filter based on the output variation of the sensor output to determine whether the filter is normal or faulty.

5 Claims, 8 Drawing Sheets

FILTER FAULT DETECTION APPARATUS

This application claims priority to Japanese Patent Application No. 2014-014356 filed on Jan. 29, 2014, the entire contents of which are hereby incorporated by reference.

BACKGROUND OF THE INVENTION

1. Field of the Invention

The present invention relates to a filter fault detection apparatus for a filter for collecting particulate matter contained in exhaust gas discharged from an internal combustion engine.

Japanese Patent No. 5115873 describes a filter fault detection apparatus for a filter for collecting particulate matter) contained in exhaust gas discharged from an internal combustion engine. This filter fault detection apparatus uses a sensor of the electric resistance type that outputs an electrical signal having a magnitude depending on the amount of particulate matter contained in exhaust gas. The sensor of the electric resistance type includes a sensor element having a pair of electrodes between which a voltage is applied. Since the particulate matter to be filtered contains carbon particles having electrical conductivity, when the amount of particulate matter collected between the electrodes of the sensor element exceeds a certain value, the electrodes become electrically conductive therebetween, and the sensor outputs an electrical signal having a magnitude depending on the amount of collected particulate matter.

The sensor is disposed downstream of a filter to be monitored. The filter fault detection apparatus including this sensor detects whether the filter is faulty or not based on the conduction start timing (the timing at which the electrical signal outputted from the sensor rises). More specifically, this filter fault detection apparatus predicts, as a reference timing, the timing at which the sensor output (the electrical signal outputted from the sensor) will rise on the assumption that the filter is a reference filter for detection (referred to as the "reference fault filter" hereinafter). If the actual timing at which the sensor output has risen actually is earlier than the reference timing, it is determined that the filter is faulty.

However, the above fault detection apparatus has a problem in that it may make an erroneous determination if the sensor output rises under unexpected circumstances. One example of the unexpected circumstances is that the collected particulate matter comes off the filter or an exhaust gas passage as a lump, and adheres to the sensor element. If an erroneous determination is made by the fault detection apparatus, a MIL (malfunction indicator light) lights causing unnecessary replacement of the filter.

SUMMARY

An exemplary embodiment provides a filter fault detection apparatus for a filter mounted on an exhaust passage of an internal combustion engine for collecting particulate matter contained in an exhaust gas, including:

a sensor mounted on the exhaust passage downstream of the filter, the sensor including an insulative sensor element formed with a pair of electrodes on which particulate matter is collected, the sensor generating a sensor output corresponding to an amount of particulate matter collected on the sensor element when the electrodes become electrically conductive therebetween, causing the sensor output to rise;

an acquiring unit that acquires, as an output variation, a temporal variation of the sensor output after rise of the sensor output; and a fault determination unit that performs a fault detection process for detecting presence of a fault in the filter based on the output variation of the sensor output to determine whether the filter is normal or faulty.

According to the exemplary embodiment, there is provided a filter fault detection apparatus capable of suppressing an erroneous determination from being made when an unexpected circumstance has occurred causing the output of its sensor to rise sharply.

Other advantages and features of the invention will become apparent from the following description including the drawings and claims.

PREFERRED EMBODIMENTS OF THE INVENTION

Figure 1:
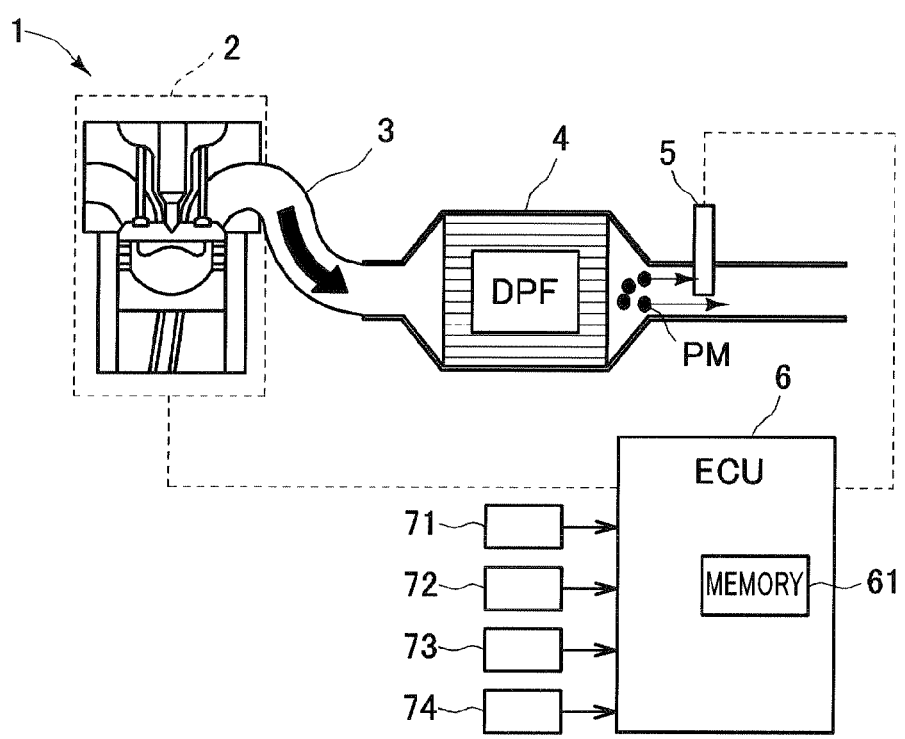
FIG. 1 is a diagram showing an engine system provided with a DPF fault detection apparatus as an embodiment of the invention.

FIG. 1 is a diagram showing an engine system 1 provided with a DPF fault detection apparatus as an embodiment of the invention. The engine system 1 includes a diesel engine 2 as an internal combustion engine. The engine 2 is provided with an injector for injecting fuel into a combustion chamber of the engine 2. The fuel injected into the combustion chamber self-ignites to generate power for driving a vehicle on which the engine system 1 is mounted.

The engine 2 has an exhaust gas passage 3 provided with a DPF (diesel particulate filter) 4. The DPF 4 is a ceramic filter made of heat-resistant ceramic such as cordierite formed in a honeycomb structure including a number of cells as gas passages, the cells being sealed at their inlets or outlets. As the exhaust gas discharged from the engine 2 flows to the downstream side while passing through the porous partition walls of the DPF 4, the PM (particulate matter) contained in the exhaust gas is collected and accumulated therein. The PM is soot consisting of carbon particles.

Figure 2:
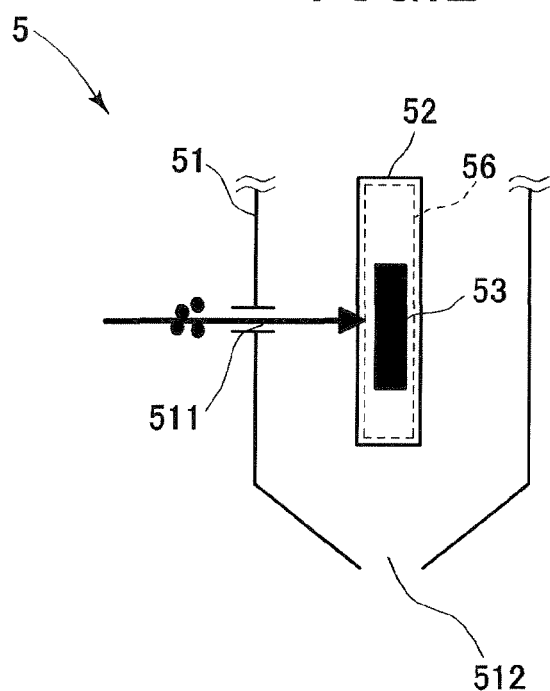
FIG. 2 is a diagram schematically showing the structure of a PM sensor included in the DPF fault detection apparatus.

A PM sensor 5 of the electric resistance type is disposed downstream of the DPF 4 for measuring the amount of PM contained in the exhaust gas. FIG. 2 is a diagram schematically showing the structure of the PM sensor 5. As shown in FIG. 2, the PM sensor 5 includes a metal-made cover 51 and a sensor element 52 disposed in the cover 51. The cover 51 is formed with a plurality of holes 511 to enable the exhaust gas flowing in the exhaust gas passage 3 to enter the inside the cover 51 through the holes 511. The cover 51 is also formed with a discharge hole 512 for discharging the exhaust gas within the cover 51 to the outside. In this embodiment, the discharge hole 512 is formed at the distal end portion of the cover 51.

Figure 3:
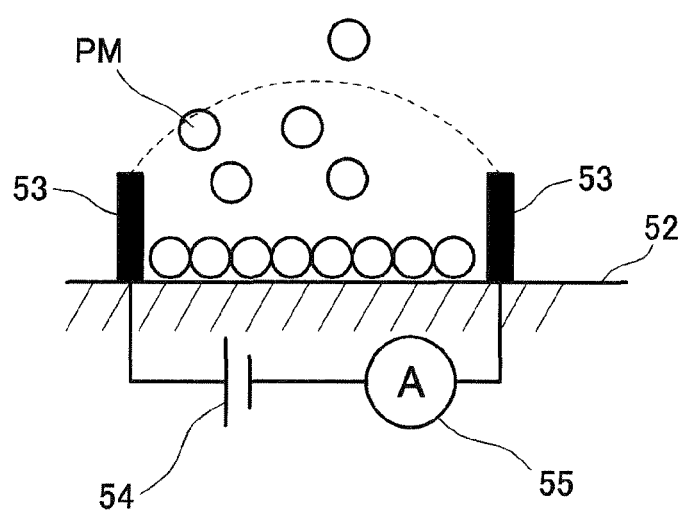
FIG. 3 is a diagram for explaining the theory of PM amount detection by the PM sensor.

The sensor element 52 includes an insulating substrate. A pair of electrodes 53 are formed on one surface of the insulating substrate so as to be opposed to each other. FIG. 3 is a diagram for explaining the theory of PM amount detection by the PM sensor 5. As shown in FIG. 3, the sensor element 52 is connected with a voltage applying circuit 54 for applying a DC voltage between the electrodes 53 in accordance with a command received from a later-explained ECU 6. Part of the PM contained in the exhaust gas within the cover 51 adheres to the sensor element 52 due to its adherence and is collected thereon. The PM not collected on the sensor element 52 is discharged from the discharge hole 512.

When the voltage is applied between the electrodes 53 by the voltage applying circuit 54, one of the electrodes 53 is charged to a positive potential and the other is charged to a negative potential. As a result, since the PM passing near the electrodes 53 is charged, the collection of the PM on the sensor element 52 is promoted. In this embodiment, the amount of PM collected on the sensor element 52 when the voltage is not applied between the electrodes 53 is negligibly small compared to when the voltage is applied between the electrodes 53. In the following, the collection of the PM by application of the voltage between the electrodes 53 is called "electrostatic collection".

The resistance between the electrodes 53 varies depending on the amount of PM collected on the sensor element 52. Accordingly, the sensor output of the PM sensor 5 varies depending on the amount of PM collected on the sensor element 52. The sensor output is null while the amount of PM collected on the sensor element 52 is smaller than a certain value. Correctly, the sensor output is smaller than a predetermined threshold above which the sensor output is regarded to have risen while the amount of PM collected on the sensor element 52 is smaller than the certain value. Since the PM consists of conductive carbon particles, when the amount of the collected PM exceeds the certain value, the electrodes 53 become electrically conductive therebetween, and the sensor output rises.

The resistance between the electrodes 53 decreases with the increase of the amount of the collected PM. Accordingly, after the sensor output rises, the sensor output increases with the increase of the amount of the collected PM. The engine system 1 is provided with an ammeter 55 (see FIG. 3) for measuring the current flowing between the electrodes 53. The measurement of the ammeter 55 makes the sensor output of the PM sensor 5.

As shown in FIG. 2, the sensor element 52 is provided with a heater 56 for burning off the PM collected on the sensor element 52 to thereby regenerate the PM sensor 5. The heater 56 is formed on a surface of the insulative substrate of the sensor element 52, on which the electrodes 53 are not formed. The heater 56 is constituted of a heating wire made of Pt, for example.

Returning to FIG. 1, the engine system 1 is provided with, other than the PM sensor 5, various sensors necessary for operating the engine 2. The various sensors include an engine speed sensor 71, an accelerator pedal sensor 72 for measuring the depression amount of the accelerator pedal, and exhaust gas temperature sensor 73 for measuring the temperature of the exhaust gas and an air flow meter for measuring the amount of the fresh air sucked into the engine 2.

The engine system 1 includes the ECU 6 for performing overall control of the engine system 1. The ECU 6 includes a CPU (not shown) and a memory 61. The ECU 6 detects the running state of the engine 2 based on the output signals of the various sensors, and calculates an optimum fuel injection amount and an optimum fuel injection pressure to control fuel injection to the engine 2.

The ECU 6 also performs a filter fault detection method for detecting a fault of the DPF 4 using a timing at which the output of the PM sensor 5 rises, taking into account an output variation (inclination) of the output of the PM sensor 5. Prior to describing the filter fault detection method, problems of the conventional filter fault detection method described in the foregoing patent document (Japanese Patent No. 5115873) are explained with reference to FIGS. 4 and 5.

Figure 4:
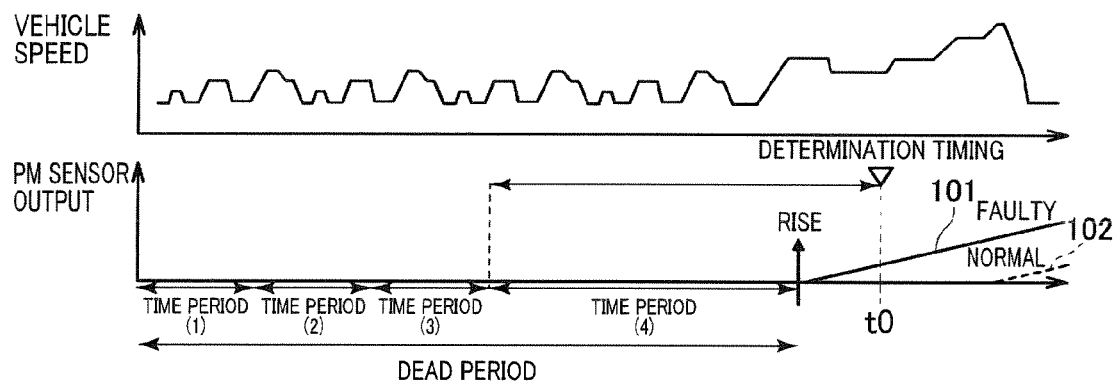
FIG. 4 is a diagram showing an example of the temporal output variation of the PM sensor.
Figure 5:
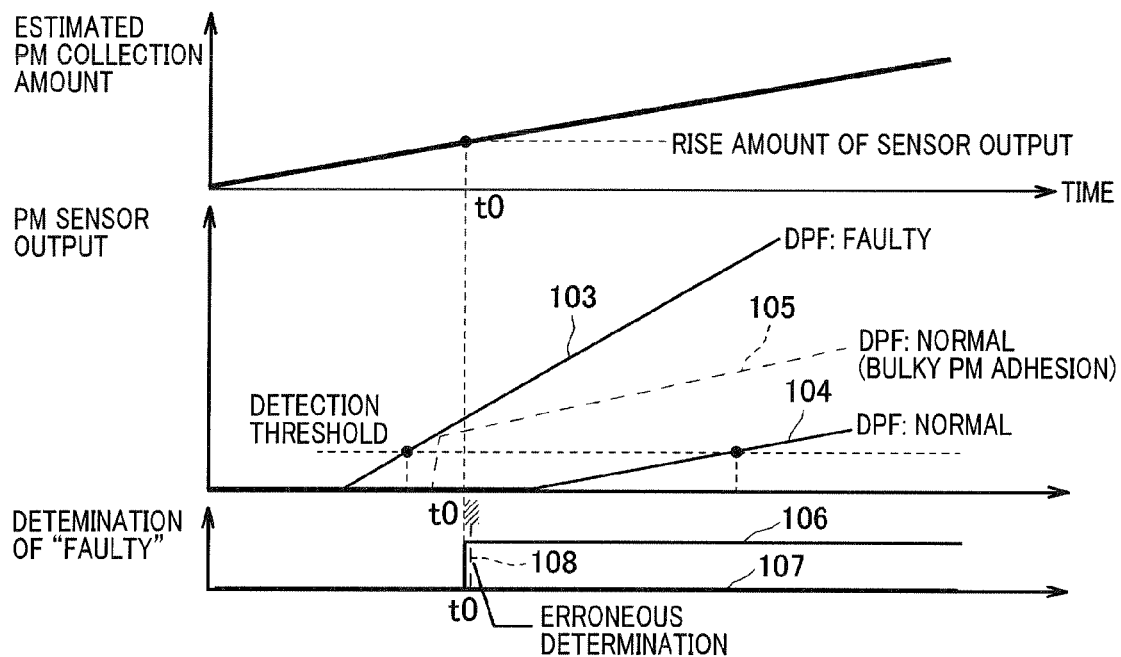
FIG. 5 is a diagram for explaining a conventional DPF fault detection method.

FIG. 4 is a diagram for explaining an example of a timing of the PM amount detection by the PM sensor 5 performed to determine whether the DPF 4 is normal or faulty during an authentication mode for authenticating whether the vehicle satisfies an exhaust gas regulation. In the upper part of FIG. 4, a vehicle speed pattern (a temporal variation of the vehicle speed) during the authentication mode is shown. In the lower part of FIG. 4, there are shown an output variation 101 when the DPF 4 is faulty and an output variation 102 when the DPF 4 is normal as examples of variations of the output of the PM sensor 5. Assuming that the PM discharge condition from the engine 2 is the same, as the degree of fault of the DPF 4 increases, the amount of PM passing the DPF 4 increases, and the amount of PM collected per unit time on the PM sensor 5 increases. Accordingly, the rise timing for the output variation 101 in the case of the DPF 4 being faulty is earlier than the rise timing for the output variation 102 in the case of the DPF 4 being normal.

In the conventional method, the reference timing t0 at which the output of the PM sensor 5 will rise is predicted on the assumption that the DPF 4 is a reference filter for fault detection (this filter being referred as the "reference fault filter" hereinafter). The DPF filter 4 is determined to be faulty if the actual timing at which the output of the PM sensor 5 rises actually is earlier than the reference timing t0, and determined to be normal if the actual timing is later than the reference timing t0.

Incidentally, to determine whether the DPF 4 is faulty or not, the time periods (1) to (4) shown in the lower part of FIG. 4 have to be passed. The time period (1) is a period necessary for the moisture contained in the exhaust gas to decrease sufficiently to prevent the PM sensor from being flooded ("flood prevention period"). The time period (2) is a period necessary for regenerating the PM sensor 5 using the heater 56 ("heater regeneration period"). The time period (3) is a period necessary for cooling the PM sensor 5 after being regenerated ("sensor cooling period"). During the time periods (1) to (3), the electrodes 53 are not applied with the voltage therebetween. The time period (4) is a period elapsed from when the voltage is applied between the electrodes 53 to start the electrostatic collection to when the sensor output rises ("PM collection period").

Accordingly, since there is a dead period (from the time period (1) to the time period (4)) depending on the structure of the PM sensor 5 before the sensor output rises, the engine 2 has to run for a long time to determine whether the DPF 4 is normal or faulty. Therefore, the chance to perform the fault detection on the DPF 4 is only once during the failure determination mode. That is, it is difficult to ensure the time periods (1) to (4) again after the fault detection is performed once.

In addition, according to the conventional method, the DPF fault detection may be erroneously made. This is explained with reference to FIG. 5. In the top part of FIG. 5, there is shown a temporal variation of the amount of PM collected on the PM sensor 5 in the case of the DPF 4 being the reference fault DPF. In the middle part of FIG. 5, there are shown, as examples of actual output variations of the PM sensor 5, an output variation 103 when the DPF 4 is faulty, an output variation 104 when the DPF 4 is normal, and an output variation 105 when an unexpected circumstance (adhesion of bulky PM, for example) occurs although the DPF 4 is normal. In the bottom part of FIG. 5, there is shown a fault detection flag of the DPF 4. When the fault detection flag is in the on state, it means that the DPF 4 is faulty. When the fault flag is in the off state, it means that the DPF 4 is normal. In the bottom part of FIG. 5, there are shown also a transition 106 of the fault detection flag corresponding to the output variation 103, a transition 107 of the fault detection flag corresponding to the output variation 104, and a transition 108 of the fault detection flag corresponding to the output variation 105.

For the output variation 103, since the sensor output rises before the reference timing t0 determined from the estimated PM collection amount, the fault detection flag is turned on at the fault detection timing (the reference timing t0) as shown by the transition 106. For the output variation 104, since the sensor output rises after the reference timing t0, the fault detection flag remains in the off state after the fault detection timing t0 as shown by the transition 107. While, if an unexpected circumstance occurs, for example if PM adhered to the DPF 4 or the exhaust gas passage 3 comes off as a lump, the sensor output may rise sharply before the reference timing t0 as shown by the output variation 105. In this case, although the DPF 4 is normal, the fault detection flag is turned on because of the rising of the sensor output before the reference timing t0 as shown by the transition 108. That is, in this case, the DPF 4 is erroneously determined to be faulty.

One of the causes of this erroneous determination is that the fault detection is performed based on only the timing at which the sensor output rises, which does not occur frequently. Therefore, the ECU 6 performs the fault detection method in which the presence of a fault in the DPF 4 is detected based on the variation (inclination) of the sensor output after the sensor output rises, in addition to the rise timing (the timing of the rise of the sensor output).

Figure 6:
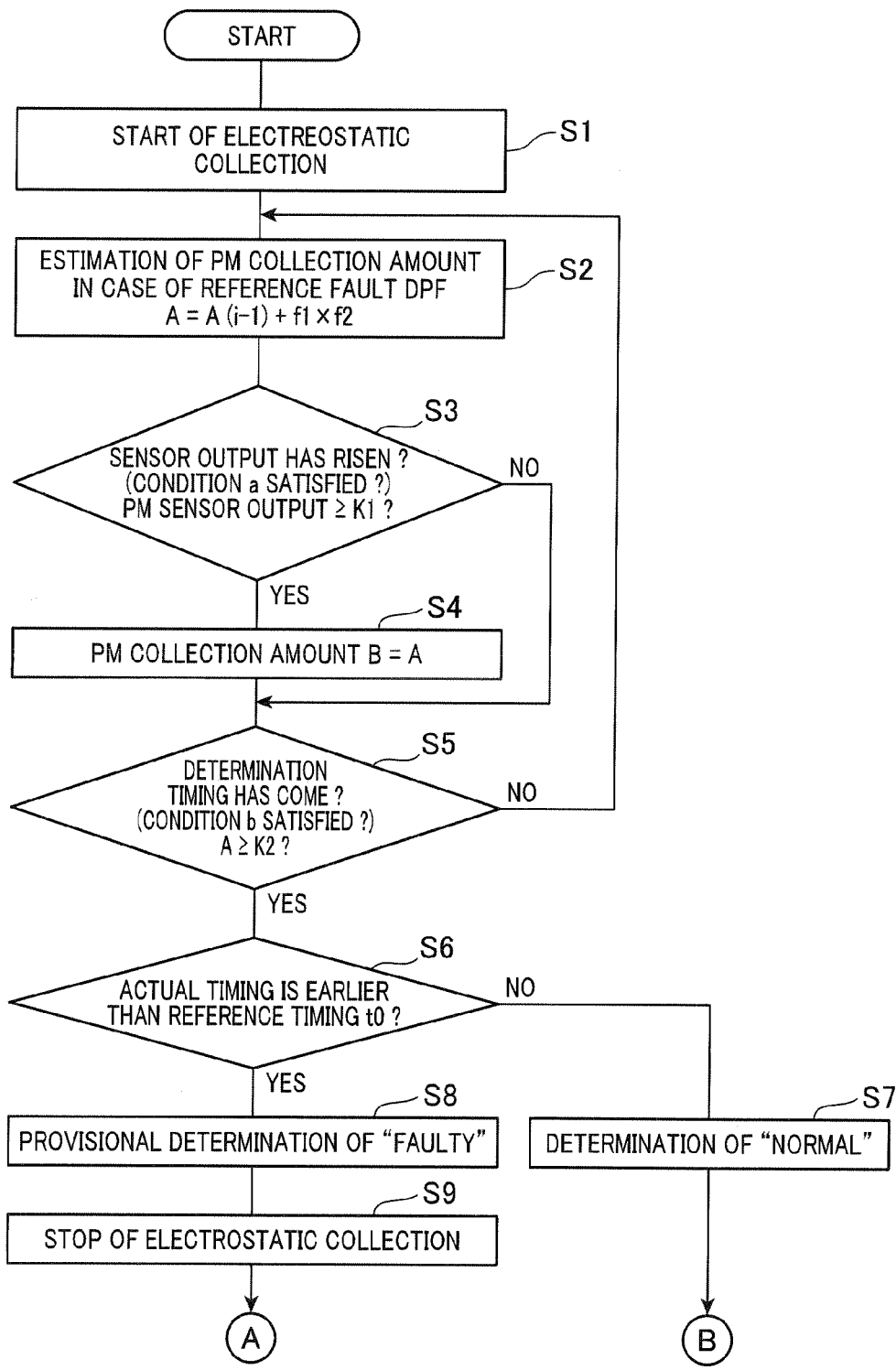
FIGS. 6 and 7 are flowcharts showing steps of a filter fault detection method performed by the DPF fault detection apparatus according to the embodiment of the invention.
Figure 7:
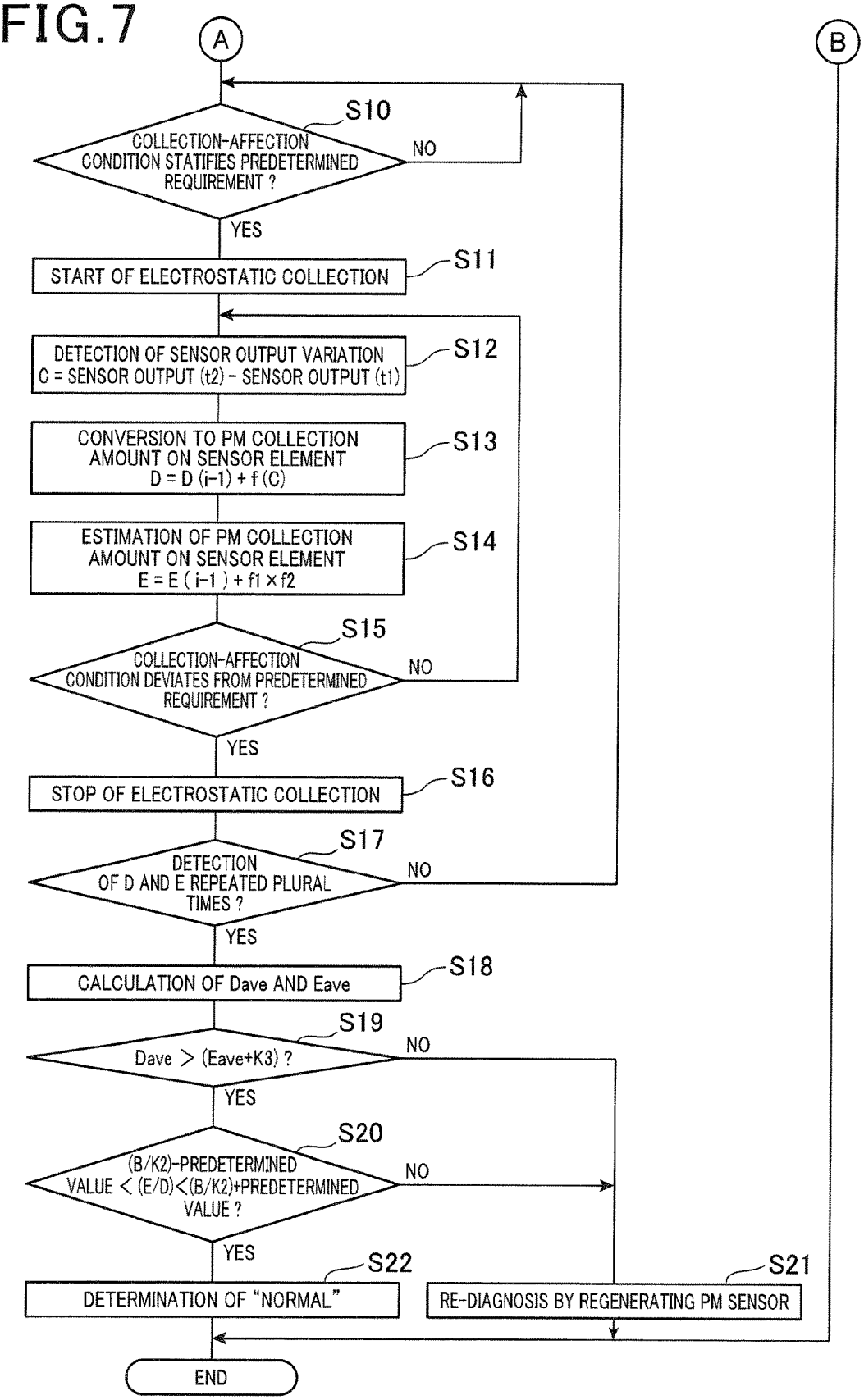
Figure 8:
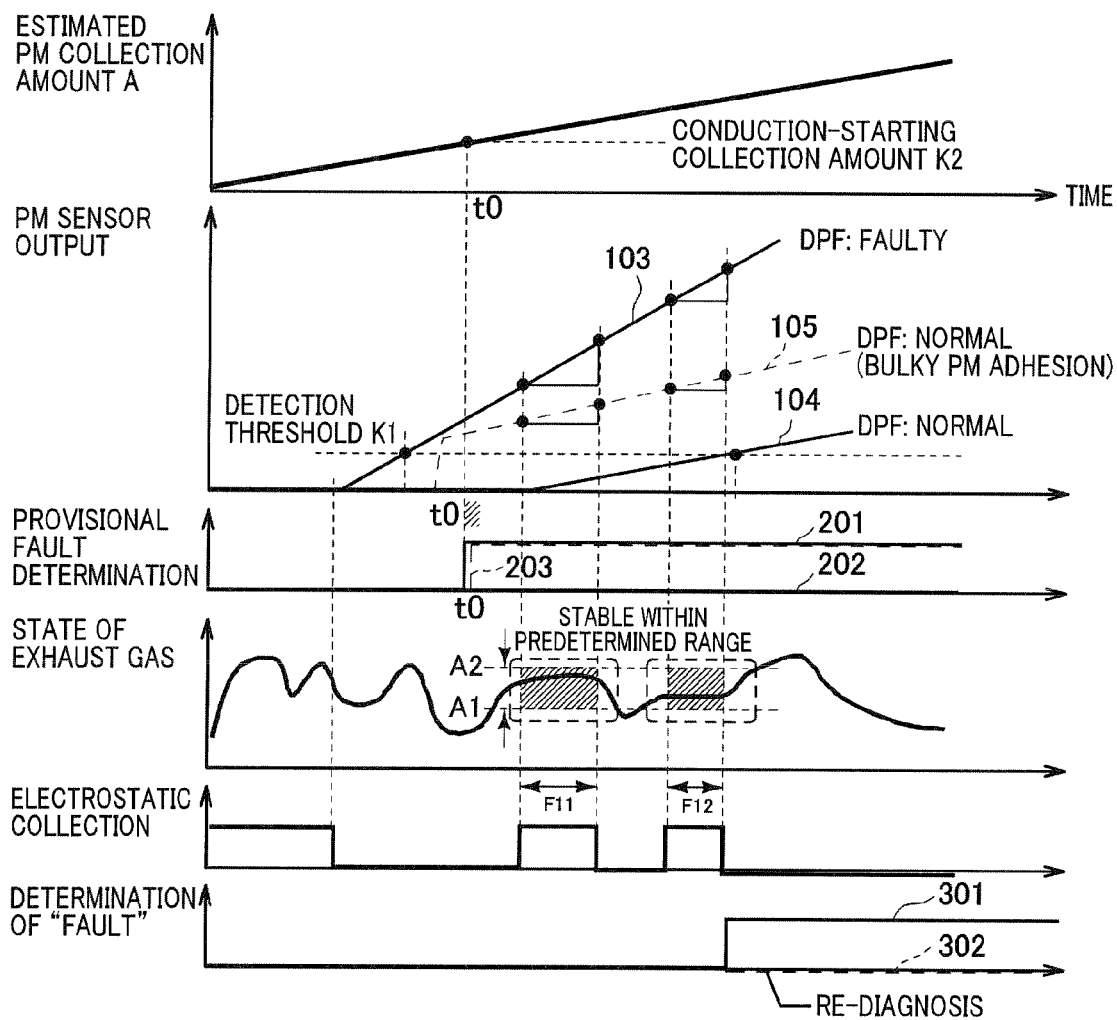
FIG. 8 is a diagram showing temporal variations of various state parameters in performing the filter fault detection method.

Next, the fault detection method performed by the ECU 6 is explained with reference to FIGS. 6 and 7. FIG. 6 shows steps of the first half of the fault detection method. FIG. 7 shows the second half of the fault detection method. In this embodiment, the fault detection method is performed after the time periods (1) to (3) shown in FIG. 4 have elapsed in the authentication mode. However, the fault detection method may be performed in any mode other than the authentication mode. For example, it may be performed while the vehicle is running normally. FIG. 8 shows temporal variations of various state parameters including the estimated amount of PM collected on the PM sensor 5 in the case of the DPF 4 being the reference fault DPF, the output of the PM sensor 5, a provisional fault detection in the later explained step S8, the state of the exhaust gas, the state of implementation of the electrostatic collection and the final result of the fault detection.

Figure 9:
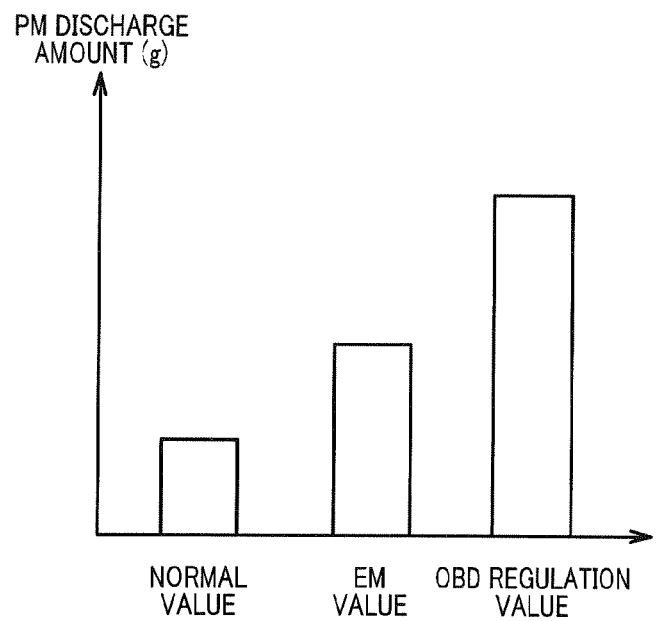
FIG. 9 is a diagram showing comparison in the PM amount passing a DPF among the normal mode, OBD restriction mode and EM restriction mode.

The fault detection method begins in step S1 where the ECU 6 applies the voltage between the electrodes 53 using the voltage applying circuit 54 to start the PM collection (electrostatic collection) on the PM sensor 5. In subsequent step S2, the accumulation amount of PM collected on the PM sensor 5 (the PM collection amount) is estimated depending on the state of the engine 2 assuming that the DPF 4 is the reference fault DPF. In this embodiment, the reference fault DPF is a DPF whose PM collection rate has been lowered below a value corresponding to the OBD (On-Board-Diagnostics) regulation value. FIG. 9 shows a comparison in the amount of PM passing the DPF 4 (PM discharge amount) among the OBD regulation value, the exhaust gas regulation value (EM regulation value), and the normal state before reaching the EM regulation value. As shown in FIG. 9, the OBD regulation value is larger than the EM regulation value such as EURO 6. For example, when the EM regulation value is 4.5 mg/km, the OBD regulation value is set to 12.0 mg/km which is 2.67 times the EM regulation value.

In step S2, the current PM collection amount f per unit time on the PM sensor 5 is estimated based on the current running state of the engine 2. More specifically, the amount of PM discharged from the engine 2, that is, the amount of PM flowing into the reference fault DPF (PM inflow amount) is estimated based on the running state of the engine 2 such as the rotational speed and the torque (fuel injection amount) of the engine 2. The rotational speed of the engine 2 can be obtained from the output of the engine speed sensor 71. The torque (fuel injection amount) of the engine 2 can be obtained from the output of the accelerator pedal sensor 72 or the engine rotational speed. A relationship between the running state of the engine (rotational speed, torque and the like) and the PM inflow amount is stored in advance as a map in the memory 61 (see FIG. 1). The current PM inflow amount can be determined as a value corresponding to the current running state of the engine 2 by referring to this map.

Further, the PM collection rate of the reference fault DPF is estimated. In this embodiment, a predetermined constant α is used as the PM collection rate of the reference fault DPF. The PM collection rate of the DPF depends on the amount of PM deposited on this DPF (the PM deposition amount) and the flow rate of the exhaust gas. Accordingly, the PM collection rate a may be compensated depending on the amount of PN collected on the DPF and the flow rate of the exhaust gas. The PM deposition amount can be estimated based on the front and back pressure difference of the DPF 4, for example. The exhaust gas flow rate can be estimated based on the amount of the fresh air measured by the airflow meter 74 (see FIG. 1), for example. In this case, the exhaust gas flow rate is estimated taking into account the expansion of the exhaust gas depending on its temperature measured by the exhaust gas temperature sensor 73 (see FIG. 1) and the compression of the exhaust gas depending on its pressure measured by a pressure sensor (not shown).

Based on the PM inflow amount and the PM collection rate thus estimated, the amount of PM outflowing from the reference fault DPF (the PM outflow amount) can be obtained. Next, of the PM outflow amount, the amount of PM that will be collected on the PM sensor 5 is estimated as a PM collection rate f per unit time. More specifically, a PM collection ratio β on the PM sensor 5 is estimated taking into account how much amount of PM flowing outside the PM sensor 5 enters inside the cover 51 through the holes 511 (see FIG. 2), and how much amount of PM entering inside the cover 51 adheres to the sensor element 52. As the PM collection ratio β, a predetermined constant may be used irrespective of various state parameters including the exhaust gas flow rate, an excess air ratio λ, the exhaust gas temperature, the temperature of the sensor element 52 and so on, or a value compensated in accordance with these state parameters may be used. For example, as the exhaust gas flow rate increases, a less amount of PM enters inside the cover 51 becomes less, a less amount of PM within the cover 51 adheres to the sensor element 52, and PM that has adhered to the sensor element 52 comes off the sensor element 52 more easily. Further, as the excess air ratio λ is smaller, that is, as the PM concentration is higher, the amount of PM not collected on the PM sensor 5 increases. Accordingly, in this embodiment, the PM collection ratio β is estimated such that it is smaller as the exhaust gas flow rate is larger or the excess air ratio λ is smaller. Further, since the thermophoretic force applied to the sensor element 52 depends on the temperatures of the exhaust gas and the sensor element 52, the PM collection ratio β depends on the temperatures of the exhaust gas and the sensor element 52. The PM collection rate f per unit time can be obtained based on the PM outflow rate and the PM collection ratio β.

The excess air ratio λ may be estimated from the running state (rotational speed, fuel injection amount and so on) of the engine 2, or from the output of a sensor mounted on the exhaust gas passage 3 for measuring the excess air ratio λ. The exhaust gas temperature can be obtained from the output of the exhaust gas temperature sensor 73. The temperature of the sensor element 52 may be obtained from the output of a temperature sensor mounted on the sensor element 52.

As described above, the PM collection amount f per unit time can be obtained from a base collection amount f1 depending on the running state of the engine 2 (the rotational speed, torque and so on), and a compensated collection amount (a compensation coefficient) f2 depending on the state of the exhaust gas (the exhaust gas flow rate, excess air ratio λ, exhaust gas temperature and so on). In step S2, the PM collection amount (the amount of PM accumulated in the PM sensor 5) A is estimated by integrating the PM collection amount f per unit time. In other words, the PM collection amount A is estimated by adding the current PM collection amount f per unit time to the PM collection amount A(i−1) obtained in step S2 performed at the previous time. The graph at the top of FIG. 8 shows a temporal variation of the PM collection amount A estimated in step S2.

In step S3, it is determined whether the sensor output (the output of the PM sensor 5) has risen or not. Specifically, it is detected whether or not a condition a is satisfied, the condition a being that the sensor output was smaller than a predetermined threshold K1 when step S3 was performed at the previous time, and the sensor output at the present time is larger than or equal to the threshold K1. The threshold K1 is shown by a broken line in the second graph from the top in FIG. 8. If the detection result in step S3 is negative, the method proceeds to step S5. If the detection result in step S3 is affirmative, the method proceeds to step S4. In step S4, the PM collection amount A estimated in step S2 is set as a PM collection amount B (referred to as the "sensor-detected time PM amount B" hereinafter) on the PM sensor 5 at the time when the sensor output is detected to have risen in the case of the DPF 4 being the reference fault DPF. The sensor-detected time PM amount B is used in step S20 explained later. Thereafter, the method proceeds to step S5.

In step S5, it is detected whether or not a timing to determine DPF fault (a presence of a fault in the DPF 4) based on the rise timing of the sensor output has come. More specifically, it is detected whether or not a condition b has been satisfied, the condition b being that the PM collection amount A estimated in step S2 reaches a predetermined threshold K2 (referred to as the "conduction-starting collection amount K2" hereinafter) above which electrical conduction between the electrodes 53 is supposed to be made, causing the sensor output to rise. The conduction-starting collection amount K2 is shown by a broken line in the uppermost graph in FIG. 8. That is, in step S5, it is detected whether or not the reference timing t0 at which the sensor output of the PM sensor 5 is supposed to rise in the case of the DPF 4 being the reference fault DPF has come.

If the detection result in step S5 is negative, the method returns to step S2. If the detection result in step S5 is affirmative, the method proceeds to step S6 to detect whether or not the timing at which the condition a in step S3 has been satisfied is earlier than the timing at which the condition b in step S5 has been satisfied. That is, it is detected whether or not the timing at which the sensor output of the PM sensor 5 has risen actually (this timing being referred to as the "actual timing") is earlier than the reference timing t0. In the second graph from the top in FIG. 8, there are shown the output variation 103 when the DPF 4 is faulty, and the output variation 104 when the DPF 4 is normal but an unexpected circumstance (adhesion of bulky PM, for example) has occurred causing the sensor output to rise sharply. In the case of the output variation 104, the actual timing is later than the reference timing t0. On the other hand, in the cases of the output variations 103 and 105, the actual timing is earlier than the reference timing t0.

If the detection result in step S6 is negative, the method proceeds to step S7 to make a determination that the DPF 4 is normal. In the example of FIG. 8, a determination of the DPF 4 being normal is made in the case of the output variation 104. After completion of step S7, the method shown in FIGS. 6 and 7 is terminated.

On the other hand, if the detection result in step S6 is affirmative, the method proceeds to step S8 to make a provisional fault determination that the DPF 4 cannot be determined to be faulty at this moment, although the DPF 4 has the potential to be faulty. The third graph from the top in FIG. 8 shows the state of the fault detection flag as a result of the process of step S8. When the fault detection flag is turned on, it means that the provisional fault determination has been made. In this graph, the state of the fault detection flag corresponding to the output variation 103 is shown by the solid line 201, the state of the fault detection flag corresponding to the output variation 104 is shown by the solid line 202, and the state of the fault detection flag corresponding to the output variation 105 is shown by the broken line 203. As shown by the solid line 202, the fault detection flag is not turned on for the output variation 104. On the other hand, the fault detection flag is turned on at the reference timing t0 for the output variations 103 and 105.

In step S9, the voltage application between the electrodes 53 is stopped to stop the electrostatic collection on the PM sensor 5. Subsequently, the method proceeds to step S10 where it is detected whether or not a condition which may affect the PM collection on the PM sensor 5 (referred to as the "collection-affecting condition") satisfies a predetermined requirement. The collection-affecting condition is the state of the exhaust gas, for example, such as the exhaust gas flow rate, the excess air ratio λ or the exhaust gas temperature. In this embodiment, the predetermined condition is that the collection-affecting condition is within a predetermined area, and the variation (inclination) of the collection-affecting condition is smaller than a predetermined value for over a certain time. The fourth graph from the top in FIG. 8 shows the variation of the exhaust gas flow rate as an example of the state of the collection-affecting condition. In this example, in step S10, it is detected whether or not a stable state has continued for over the predetermined time, the stable state being that the state of the exhaust gas is in a range between a lower limit A1 and an upper limit A2, and the variation (inclination) of the state of the exhaust gas is smaller than a predetermined value within this range. The hatched part in FIG. 8 shows an area in which this condition is satisfied.

The exhaust gas flow rate as the collection-affecting condition may be estimated based on the amount of the fresh air measured by the airflow meter 74, or may be determined based the output of a sensor mounted on the exhaust gas passage 3 for measuring the exhaust gas flow rate. Step S10 may be modified to detect whether or not the state of the engine 2 (rotational speed, torque, fuel injection amount and so on) satisfies a predetermined condition in addition to detect whether the state of the exhaust gas satisfies the predetermined condition or not. As the state of the engine 2 varies, the amount of PM discharged from the engine 2 varies, causing the amount of PM collected on the PM sensor 5 to vary.

If the detection result in step S10 is negative, the method waits until the predetermined condition is satisfied. If the detection result in step S10 is affirmative, the method proceeds to step S11 to start the electrostatic collection on the PM sensor 5. In step S 12, an output variation amount C of the PM sensor 5 is measured. Specifically, the difference between the output (t2) of the PM sensor 5 at the moment of the present time t2 and the output (t1) of the PM sensor 5 at the moment of time t1 slightly earlier than the present time t2 is calculated as the output variation amount C.

Figure 10:
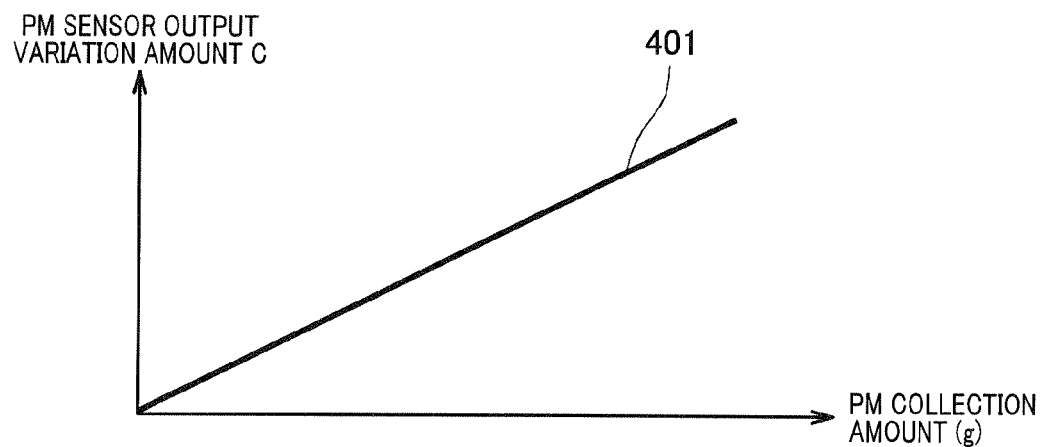
FIG. 10 is a diagram showing an example of a relationship between the temporal output variation of the PM sensor and the amount of collected PM.

Subsequently, in step S13, the output variation amount C is converted to a PM collection amount D as the amount of PM collected on the PM sensor 5 from the time of start of the electrostatic collection in step S12 to the present time. In this embodiment, a relationship 401 between the output variation amount C of the PM sensor 5 and the PM collection amount on the PM sensor 5 as shown in FIG. 10 is checked in advance and stored in the memory 61 (see FIG. 1). The PM collection amount f(C) corresponding to the present output variation amount C is obtained by referring to the relationship 401 stored in the memory 61. This PM collection amount f(C) is added to the PM collection amount obtained when step S13 was performed at the previous time, that is, added to the PM collection amount (i−1) as the amount of PM collected from the time of start of the electrostatic collection to the time at which step S13 was performed at the previous time.

In subsequent step S14, a PM collection amount E as the amount of PM collected from the time of start of the electrostatic collection to the present time in the case of the DPF 4 being the reference fault DPF is estimated. Specifically, the present PM collection amount f per unit time is calculated from the base collection amount f1 depending on the running state of the engine 2 (rotational speed, torque and so on) and the compensated collection amount f2 (the compensation coefficient) depending on the state of the exhaust gas (the exhaust gas flow rate, excess air ratio λ, exhaust gas temperature and so on). This PM collection amount f is added to the PM collection amount E(i−1) obtained when step S14 was performed at the previous time to obtain the present PM collection amount E.

After that, in step S15, it is detected whether or not the collection-affecting condition has deviated from the predetermined condition. If the detection result in step S15 is negative, the method returns to step S12. If the detection result in step S15 is affirmative, the method proceeds to step S16 to stop the electrostatic collection on the PM sensor 5. As long as the collection-affecting condition satisfies the predetermined requirement, steps S12 to S14 are performed repeatedly. Therefore, the PM collection amount D (the converted collection amount) finally obtained in step S13 is the PM collection amount calculated from the output variation of the PM sensor 5 during a collection period F from the start of the electrostatic collection in step S11 to the end of the electrostatic collection in step S16. On the other hand, the PM collection amount E (the reference collection amount) finally obtained in step S14 is the amount of PM collected during the collection period F in the case of the DPF 4 being the reference fault DPF. The fifth graph from the top in FIG. 8 shows the collection periods F11 and F12. In each of steps S12 and S13, the output variation amount in the collection period F11 or F12, and the PM collection amount converted from this output variation amount are calculated for the output variation 103 (when the DPF 4 is faulty) or the output variation 105 (when bulky PM adheres) are calculated.

After the electrostatic collection is stopped in step S16, the method proceeds to step S17 to detect whether or not the calculations of the converted collection amount D and the reference collection amount E have been repeated plural times (twice or thrice, for example). If the detection result in step S17 is negative, the method returns to step S10 to calculate the converted collection amount D and the reference collection amount E again for the period (collection period) in which the collection-affecting condition satisfies the predetermined requirement. In the example of FIG. 8, the converted collection amount D and the reference collection amount E are calculated in each of the two collection periods F11 and F12.

Figure 11:
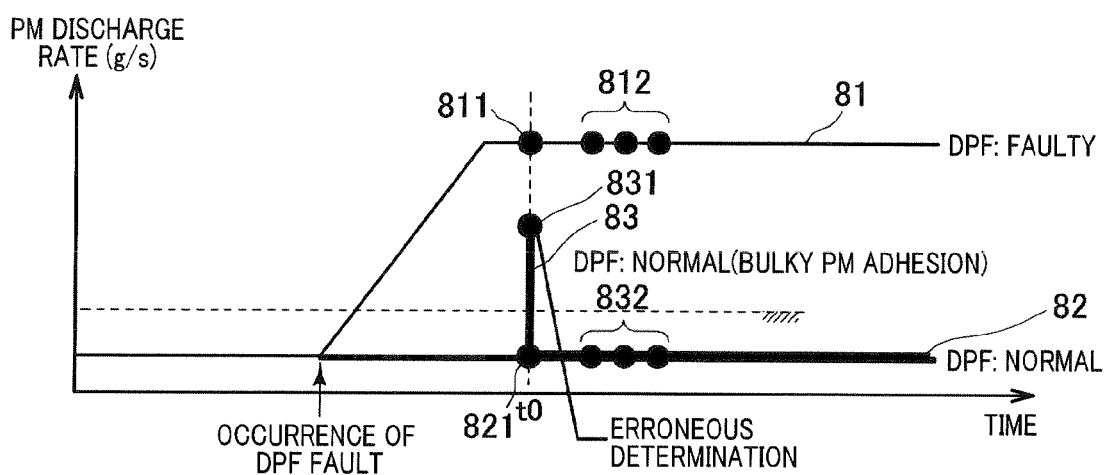
FIG. 11 is a diagram showing an example of temporal output variations of the rate of PM discharged from the DPF in each of a DPF normal state, a DPF fault state and a bulky PM adhered state.

An example in which the converted collection amount D and the reference collection amount E are calculated multiple times is explained with reference to the graph of FIG. 11. FIG. 11 shows a temporal variation of the PM discharge rate (the discharge rate of PM from the DPF 4 in each of the cases where the DPF 4 is normal, the DPF 4 is faulty, and the DPF 4 is normal but the sensor output rises abruptly due to adhesion of bulky PM. In the graph of FIG. 11, the PM discharge rate is represented by the vertical axis to explain the collection state of PM on the PM sensor 5 depending on the rise timing of the sensor output and the collection state of PM on the PM sensor 5 depending on the output variation of the PM sensor 5 after the rise timing the sensor output on the same dimension. In FIG. 11, the variation of the PM discharge rate when the DPF 4 is faulty is shown by the solid line 81, the variation of the PM discharge rate when the DPF 4 is normal is shown by the solid line 82, and the variation of the PM discharge rate when bulky PM adheres is shown by the solid line 83.

As shown by the output variation 81 in case of DPF fault, when the DPF 4 is faulty, the PM discharge rate increases after occurrence of a DPF fault, and the PM discharge rate at a time point 811 at the reference timing t0 exceeds a fault detection threshold corresponding to the threshold K1 in step S3, as a result of which the detection result in step S6 becomes affirmative. As shown by the output variation 82 in case of DPF normal, when the DPF 4 is normal, the PM discharge rate 821 at the reference timing t0 is smaller than the fault detection threshold, as a result of which the detection result in step S6 becomes negative. As shown by the output variation 83 in case of adhesion of bulky PM, when bulky PM adheres, the PM discharge rate 831 at the reference timing t0 exceeds the fault detection threshold, as a result of which the detection result in step S6 becomes affirmative although the DPF 4 is normal.

When the DPF 4 is faulty, the PM discharge rate after the reference timing t0 is nearly as large as the PM discharge rate 831 at the reference timing t0. On the other hand, when bulky PM has adhered, the PM discharge rate after the reference timing t0 becomes smaller than the PM discharge rate 831 at the reference timing t0. Accordingly, it is possible to distinguish between DPF fault and bulky PM adhesion by monitoring the output variation of the PM sensor 5, that is, by monitoring the PM discharge rate after the reference timing t0. To increase the accuracy of the distinction, the state of the PM collection after the reference timing t0 (the PM discharge rate in FIG. 11, the converted collection amount D in FIGS. 6 and 7) is detected plural times at time points 812 or 832 (see FIG. 11) after the reference timing t0. Incidentally, the fault detection threshold after the reference timing t0 in FIG. 11 corresponds to a threshold K3 in the later-explained step S19.

Returning to FIG. 7, if the detection result in step S17 is affirmative, the method proceeds to step S 18. In step S18, an average value Dave of the converted collection amount D measured plural times is calculated, and also an average value Eave of the reference collection amount E measured plural times is calculated. In the example of FIG. 11, an average value of the PM discharge rates at the three time points 812 or the PM discharge rates at the three time points 832 is calculated in step S18.

In subsequent step S19, it is detected whether or not the average value Dave of the converted collection amount D calculated in step S18 is larger than the threshold K3 determined depending on the average value Eave of the reference collection amount E. The threshold K3 may be the average value Eave itself, or the sum of the average value Eave and a predetermined value G (=Eave+G). In the case of the threshold K3 being Eave+G, since the chance of detecting DPF fault becomes low, it is possible to suppress to make an erroneous determination that the DPF 4 is faulty although it is normal actually. In the example of FIG. 11, the broken line showing the fault detection threshold corresponds to the threshold K3. In contrast, in the case of the threshold K3 being the average value Eave itself, since the chance of detecting DPF fault becomes high, it is possible to suppress to make an erroneous determination that the DPF 4 is normal although it is faulty actually. Incidentally, the process of step S19 is a process to detect whether or not the inclination of the output variation 103 (see FIG. 8) and the inclination of the output variation 105 (see FIG. 8) after the output of the PM sensor 5 rises are larger or smaller than the inclination of the output variation after the output of the PM sensors 5 rises in the case of the DPF 4 being the reference fault DPF (the inclination of the estimated collected PM amount shown in the uppermost graph in FIG. 8 converted to the output of the PM sensor 5).

If the detection result in step S19 is negative, it means that the output variation (inclination) of the PM sensor 5 after the rise of the sensor output is smaller than the output variation (inclination) of the PM sensor 5 in the case of the DPF 4 being the reference fault DPF. In this case, the result of the DPF fault detection made based on the rise timing of the sensor output and the result of the DPF fault detection made based on the output variation of the PM sensor 5 after the rise of the sensor output may be different from each other. Accordingly, the fault diagnosis of the DPF 4 is performed again in step S21. Specifically, the PM sensor 5 is regenerated using the heater 56 (see FIG. 2), and then the fault detection method shown in FIGS. 6 and 7 is performed again. If the rise timing of the sensor output is detected to be later than the reference timing (step S6: NO), the DPF 4 is finally determined to be normal. If the rise timing of the sensor output is detected to be earlier than the reference timing (step S6: YES), the fault determination process is performed again based on the output variation after the rise of the sensor output. After completion of step S21, the fault determination process shown in FIGS. 6 and 7 is terminated.

In the example shown in FIG. 11, in the case of adhesion of bulky PM, since the sensor output at the time points 832 is smaller than the fault determination threshold, the determination result in step S19 is negative; the fault diagnosis is performed again in step S21. Also, in the example shown in FIG. 8, since the output variation 105 (inclination) after the rise of the sensor output in the case of adhesion of bulky PM is smaller than the output variation (inclination) in the case of the DPF 4 being the reference fault DPF, the fault diagnosis is performed again in step S21. Therefore, in the bottom graph in FIG. 8, the fault detection flag 302 corresponding to the output variation 105 is in the state showing repetition of the fault diagnosis, that is, in the off state.

If the detection result in step S19 is affirmative, the method proceeds to step S20. In step S20, the PM collection state determined based on the rise timing of the output of the PM sensor 5 (referred to as the "first collection state" hereinafter), and the PM collection state determined based on the output variation after the rise of the output of the PM sensor 5 (referred to as the "second collection state" hereinafter) are obtained. Subsequently, it is detected whether or not the difference between the first collection state and the second collection state is smaller than a predetermined value in step S20.

Figure 12:
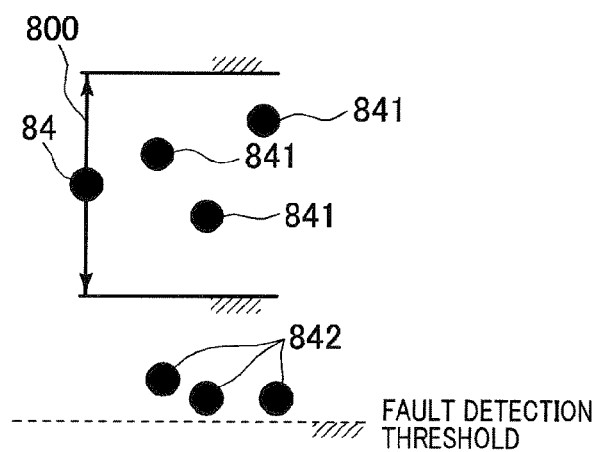
FIG. 12 is a diagram for explaining the concept of step S20 of the filter fault detection method.

Next, the purpose of step S12 is explained with reference to FIG. 12. In FIG. 12, the reference numeral 84 indicates a point of the first collection state, and the reference numerals 841 and 842 indicate points of the second collection state. The point 84 corresponding to the time point 811 at the reference timing t0 shown in FIG. 11, and the points 841 and 842 correspond to the time points 812 after the reference timing t0 shown in FIG. 11. The PM discharge rates at the points 841 and 842 are larger than the fault detection threshold K3.

It takes a rather long time period before the output of the PM sensor 5 rises reflecting the PM collection state during this time period. Accordingly, the first collection state is reliable even if an unexpected circumstance occurs, because it reflects the PM collection state at least before the unexpected circumstance occurs. In addition, if the second collection state is reliable, the second collection state is not so different from the first collection state. Hence, step S20 ensures suppressing an erroneous DPF fault detection from being made by checking whether the difference between the second collection state and the first collection state is sufficiently small to confirm whether the second collection state is reliable, and checking whether the results of steps S10 to S19 performed based on the second collection state are reliable.

Specifically, in step S20, there is obtained a deviation from the actual PM collection amount is obtained based on the difference between the PM collection amount on the PM sensor 5 (estimated value) in the case of the DPF 4 being the reference fault DPF and the actual PM collection amount determined from the output of the PM sensor 5 (the rise timing and the output variation after the rise of the sensor output). More specifically, the ratio of the sensor-detected time PM amount B obtained in step S4 to the conduction-starting collection amount K2 used in step S5 is calculated as a deviation ratio B/K2 of the first collection state. The conduction-starting collection amount K2 corresponding to the actual PM collection amount determined from the rise timing of the output of the PM sensor 5. The sensor-detected time PM amount B corresponds to the PM collection amount in the case of the DPF 4 being the reference fault DPF. Further, the ratio E/D of the reference collection amount E obtained in step S14 to the converted collection amount D obtained in step S13 is calculated as a deviation ratio E/D of the second collection state. The converted collection amount D corresponds to the actual PM collection amount determined from the sensor output variation after the rise timing. The reference collection amount E corresponds to the PM collection amount after the rise of the sensor output in the case of the DPF 4 being the reference fault DPF. In the example of FIG. 12, the point 84 corresponds to the ratio B/K2, and the points 841 and 842 correspond to the ratio E/D.

In step S20, it is detected whether or not the difference between deviation ratio E/D of the second collection state and the deviation ratio B/K2 of the first collection state is within a predetermined range. That is, it is detected whether the relationship of (B/K2−the predetermined value<=E/D<=B/K2+the predetermined value) holds. For example, if the K2=10 g, B=7 g, E=0.7 g, and D=1 g, it is determined that the second collection state is equal to the first collection state. In the example of FIG. 12, it is detected whether or not the points 841 and 842 of the second collection state are within a range 800 around the point 84 of the point 84 of the first collection state. Incidentally, since the converted collection amount D and the reference collection amount E are detected plural times in steps S13 and S14, a plurality of the deviation ratios E/D are obtained. Accordingly, step S20 may detect whether or not all the plurality of the deviation ratios E/D are within the area around the deviation ratio B/K2, or an average value of the plurality of the deviation ratios E/D, that is, the ratio of Eave/Dave obtained in step S18 is within the area around the deviation ratio B/K2. In the example of FIG. 12, step S20 may detect whether or not all the three points 841 or all the three points 832 are within the range 800, or alternatively, an average value of the three points 841 or the three points 842 is within the range 800.

If the detection result in step S20 is negative, the method proceeds to step S21 to perform the fault diagnosis again assuming that the reliability of the second collection state is low. In the example of FIG. 12, since the points 842 are outside the range 800, the fault diagnosis of the DPF 4 is performed again assuming that their reliability is low.

On the other hand, if the detection result in step S20 is affirmative, the DPF 4 is finally determined to be faulty assuming that the reliability of the second collection state is high, and accordingly, the results of step S10 to S19 are reliable. In the example of FIG. 12, since the points 841 are outside the range 800, the DPF 4 is finally determined to be faulty assuming that their reliability is high. In the example of FIG. 8, the fault detection flag 301 corresponding to the output variation 103 is in the state showing DPF fault, that is, in the on state, because the output variation 103 for DPF fault is larger than the output variation of the PM sensor 5 for the case of the DPF 4 being the reference fault DPF (step S19: YES), and the condition in step S20 is satisfied. After completion of step S22, the method is terminated.

As explained above, according to the above embodiment, since, in addition to the rise timing of the sensor output, the variation after the rise of the sensor output is taken into account in determining whether the DPF 4 is faulty, it is possible to suppress an erroneous determination from being made. Particularly, even if an unexpected circumstance such as adhesion of bulky PM occurs, it is possible to suppress making an erroneous determination that the DPF 4 is faulty although it is normal actually. Since the PM collection amount (the reference collection amount) for the case of the DPF 4 being the reference fault DPF is estimated based on the running state of the engine, the fault detection threshold used for comparison with the sensor output variation can be determined correctly reflecting the running state of the engine.

Since the electrostatic collection is performed only during the time period in which the collection-affecting condition satisfies the predetermined requirement, it is possible to suppress the sensor output variation. This makes it possible to increase the accuracy of the DPF fault detection. Since the converted collection amount D and the reference collection amount E are measured plural times in steps S13 and S14, and the DPF fault detection is performed in steps S18 and S19 based on the plurality of the converted collection amounts D and the reference collection amounts E, the accuracy of the DPF fault detection can be increased.

If the detection result in step S19 is negative, the method does not immediately determine that the DPF 4 is faulty, but proceeds to step S21 to perform again the DPF fault detection. Accordingly, it is possible to suppress to make an erroneous determination that the DPF 4 is normal although it is faulty actually. In step S22, the degree of the reliability of the second collection state (E/D) is detected taking into account the first collection state (B/K2), and if the degree of the reliability of the second collection state is low, it is inhibited to make a determination that the DPF 4 is faulty. This make it possible to make an erroneous determination.

In the above embodiment, if the rise timing of the sensor output is detected to be later than the reference timing, the fault detection process (the processes in step S8 and the following steps) based on the sensor output variation after the rise of the sensor output is suspended, and the DPF 4 is immediately determined to be normal in step S7. Accordingly, it is possible to know the determination result immediately.

In the above embodiment, steps S10 to S13 and steps S15-S17 constitute an acquiring unit, steps S7, S19, S21 and S22 constitute a fault determination unit, step S14 constitutes a collection amount estimating unit, step S5 constitutes a timing predicting unit, step S6 constitutes timing comparing unit, step S18 constitutes an average calculating unit, step S20 constitutes a collection state acquiring unit and a range detecting unit.

The present invention is not limited to the above embodiment, but can be worked with various modifications. For example, although the DPF fault detection is performed using both the rise timing of the PM sensor and the output variation after the rise of the sensor output in the above embodiment, the DPF fault detection may be performed using only the output variation after the rise of the sensor output. That is, the DPF fault detection may be performed by only the processes of steps S10 to S20. In this configuration, since the process for detecting whether the rise timing of the sensor output is earlier or later than the reference timing can be omitted, the DPF fault detection can be made promptly.

In the above embodiment, the process for detecting whether the rise timing of the sensor output is earlier or later than the reference timing t0 is performed first, and if the rise timing of the sensor output is detected to be earlier than the reference timing t0, the process of the DPF fault detection is performed based on the output variation after the rise of the sensor output. However, the sequence of these processes may be reversed. That is, the above embodiment may be modified such that the fault detection process (the processes in steps S10 to S20) is performed based on the output variation after the rise of the sensor output, and determines that the DPF 4 is normal if the result of the fault detection process shows no problem (S19: NO, S20: NO). On the other hand if the result of the fault detection process shows problem (S20: YES), it is detected whether the rise timing of the sensor output is earlier or later than the reference timing t0. If the rise timing of the sensor output is detected to be earlier than the reference timing t0, the DPF 4 is determined to be faulty, and otherwise, the DPF fault detection is performed again. Also in this configuration, it is possible to suppress erroneous determination of the DPF fault detection from being made.

In the above embodiment, if the detection result in step S19 or S20 is negative, the DPF fault detection is performed again in step S21. However, in this case, the DPF 4 may be determined to be normal without performing step S21 so that a determination of the DPF fault detection can be made promptly. In the above embodiment, an average value of the converted collection amounts D is compared with an average value of the reference collection amounts E in step S19. However, a maximum one of the converted collection amounts D may be compared with a maximum one of the reference collection amounts E in step S19.

The above explained preferred embodiments are exemplary of the invention of the present application which is described solely by the claims appended below. It should be understood that modifications of the preferred embodiments may be made as would occur to one of skill in the art.

What is claimed is:

1. A filter fault detection apparatus for a filter mounted on an exhaust passage of an internal combustion engine for collecting particulate matter contained in an exhaust gas, comprising:
   a sensor mounted on the exhaust passage downstream of the filter, the sensor including an insulative sensor element formed with a pair of electrodes on which particulate matter is collected, the sensor generating a sensor output corresponding to an amount of particulate matter collected on the sensor element when the electrodes become electrically conductive therebetween, causing the sensor output to rise;
   an acquiring unit that acquires, as an output variation, a temporal variation of the sensor output after rise of the sensor output; and
   a fault determination unit that performs a fault detection process for detecting presence of a fault in the filter based on the output variation of the sensor output to determine whether the filter is normal or faulty;
   a collection amount estimating unit that estimates, as a reference collection amount, an amount of particulate matter collected on the sensor element in a case of the filter being a reference fault filter,
   the fault determination unit being configured to perform the fault detection process based on comparison between the output variation for a time period in which the sensor output varies and the reference collection amount for the time period; and
   a timing predicting unit that predicts, as a reference timing, a timing at which the sensor output will rise in the case of the filter being the reference fault filter, and a timing comparing unit that detects whether an actual timing at which the sensor output actually rises is earlier or later than the reference timing,
   the fault determination unit being configured to determine that the filter is faulty if the actual timing is detected to be earlier than the reference timing, and a converted collection amount of particulate matter collected on the sensor element converted from the output variation of the sensor output is detected to be larger than the reference collection amount.

2. The filter fault detection apparatus according to claim 1, further comprising a regenerating unit that regenerates the filter by burning off particulate matter collected on the sensor element,
   the fault determination unit being configured to perform the fault detection process after regenerating the sensor if the actual timing is detected to be earlier than the reference timing and the converted collection amount is detected to be smaller than the reference collection amount.

3. The filter fault detection apparatus according to claim 1, wherein the fault determination unit is configured to determine that the filter is normal without performing comparison between the converted collection amount and the reference collection amount if the actual timing is detected to be later than the reference timing.

4. A filter fault detection apparatus for a filter mounted on an exhaust passage of an internal combustion engine for collecting particulate matter contained in an exhaust gas, comprising:
   a sensor mounted on the exhaust passage downstream of the filter, the sensor including an insulative sensor element formed with a pair of electrodes on which particulate matter is collected, the sensor generating a sensor output corresponding to an amount of particulate matter collected on the sensor element when the electrodes become electrically conductive therebetween, causing the sensor output ot rise;
   an acquiring unit that acquires, as an output variation, a temporal variation of the sensor output after rise of the sensor output; and
   a fault determination unit that performs a fault detection process for detecting presence of a fault in the filter based on the output variation of the sensor output to determine whether the filter is normal or faulty; wherein:
   the acquiring unit acquires the output variation during a time period in which a predetermined condition affecting collection of particulate matter on the sensor element satisfies a predetermined requirement;
   the acquiring unit acquires the output variation during each of a plurality of the time periods, and the fault determination unit performs the fault detection process based on a plurality of the output variations for the plurality of the time periods;
   an average calculating unit that calculates an average value of the plurality of the output variations; and the fault determination unit is configured to perform the fault detection process based on the average value.

5. A filter fault detection apparatus for a filter mounted on an exhaust passage of an internal combustion engine for collecting particulate matter contained in an exhaust gas, comprising:
- a sensor mounted on the exhaust passage downstream of the filter, the sensor including an insulative sensor element formed with a pair of electrodes on which particulate matter is collected, the sensor generating a sensor output corresponding to an amount of particulate matter collected on the sensor element when the electrodes become electrically conductive therebetween, causing the sensor output to rise;
- an acquiring unit that acquires, as an output variation, a temporal variation of the sensor output after rise of the sensor output;
- a fault determination unit that performs a fault detection process for detecting presence of a fault in the filter based on the output variation of the sensor output to determine whether the filter is normal or faulty; and
- a collection state acquiring unit that acquires, as a first collection state, a collection state of particulate matter determined from a rise timing of the sensor output, and acquires, as a second collection state, a collection state of particulate matter determined from the output variation of the sensor output after the sensor output rises, and a range detecting unit that detects whether the second collection state is within a range in which a difference between the second and first collection states is smaller than a predetermined value,
the fault determination unit being configured to allow the filter to be determined to be faulty if the second collection state is detected to be within the range, and inhibit the filter to be determined to be faulty if the second collection state is detected to be outside the range.

* * * * *